(12) United States Patent
Suga

(10) Patent No.: US 6,662,527 B1
(45) Date of Patent: Dec. 16, 2003

(54) BAG FORMING-FILLING-PACKAGING MACHINE

(75) Inventor: Tadoru Suga, Ibaraki (JP)

(73) Assignee: Ibaraki Seiki Machinery Company, Ltd., Osaka (JP)

( * ) Notice: Subject to any disclaimer, the term of this patent is extended or adjusted under 35 U.S.C. 154(b) by 0 days.

(21) Appl. No.: 10/325,579

(22) Filed: Dec. 19, 2002

(51) Int. Cl.[7] .............................................. B65B 51/10
(52) U.S. Cl. ............................. 53/374.6; 53/79; 53/97; 53/374.3; 53/374.5; 53/403; 53/434; 53/450; 53/477; 53/550
(58) Field of Search .............................. 53/374.6, 403, 53/374.5, 374.3, 373.7, 79, 97, 110, 510, 511, 477, 434, 52, 350, 450

(56) References Cited

U.S. PATENT DOCUMENTS

| | | | | |
|---|---|---|---|---|
| 3,951,274 A | * | 4/1976 | Yamamoto | 53/236 |
| 5,682,727 A | * | 11/1997 | Harte et al. | 53/434 |
| 5,689,942 A | * | 11/1997 | Suga | 53/550 |
| 6,539,689 B1 | * | 4/2003 | Yoshimoto | 53/434 |

FOREIGN PATENT DOCUMENTS

JP      07291234      7/1995

* cited by examiner

Primary Examiner—Eugene Kim
Assistant Examiner—Christopher Harmon
(74) Attorney, Agent, or Firm—Reising, Ethington, Barnes, Kisselle, P.C.

(57) ABSTRACT

A tube film grip-pressing time by a pair of seal bars is controlled to set longer. A crank mechanism allows a seal bar frame supported by a pair of rails to reciprocate along the rails. The crank mechanism includes an arm which supports one end support shaft and is capable of swinging, and a circular crank plate which is rotated by power of a center shaft. The crank mechanism is fixed to a crankshaft which rotatably supports a groove-like slide which is engaged with a slide guide formed along a longitudinal direction of a lower surface of the arm on an eccentric portion of the crank plate. A top dead center and a bottom dead center of the arm are formed respectively θ1 and θ2 beyond a 180° region connected across a center shaft that, is a. A servo motor which drives the center shaft controls speed in the point 55 to point 56 region having a radius of 180° to make the speed constant, and cause the frame to advance along rails and then move backward at a high speed.

3 Claims, 8 Drawing Sheets

FIG. 8

| | ARM SWING ANGLE | CORRESPONDING SIZE | |
|---|---|---|---|
| ① | 2.76° | 14.94mm | |
| ② | 2.74° | 14.76mm | |
| ③ | 2.68° | 14.39mm | |
| ④ | 2.59° | 13.83mm | |
| ⑤ | 2.47° | 13.07mm | |
| ⑥ | 2.25° | 12.08mm | |
| ⑦ | 2.31° | 10.86mm | |
| ⑧ | 2.09° | 9.35mm | |
| ⑨ | 1.82° | 7.51mm | |
| | | 12.31mm | AVERAGE VALUE |
| | | | |
| | 1.48° | 5.25mm | |
| | 1.04° | 2.47mm | |
| | 0.02° | 0.04mm | |
| | | 7.76mm | TOTAL VALUE |

BAG FORMING-FILLING-PACKAGING MACHINE

BACKGROUND OF THE INVENTION

1. Field of the Invention

The present invention relates to a bag forming-filling-packaging machine which allows a pair of heat-seal bars disposed to oppose to each other across a tube film which moves in a longitudinal direction to carry out block motion in the same direction as that of the film, the bag forming-filling-packaging machine keeping constant to an utmost extent a moving procedure speed of the seal bars in the same direction as that of the film.

2. Description of the Prior Art

Generally, the bag forming-filling-packaging machine transfers a belt-shaped film while forming the same into a cylindrical shape, transfers an object to be packaged into the tube film at equal distances, and cross seals the tube film by a pair of seal bars to separate the packaged object from one another. When a belt-shaped film having a low melting degree is used in the bag forming-filling-packaging machine, it is necessary to elongate the heating time of the belt-shaped film as long as possible, therefore both the seal bars which grip the tube film with pressure are moved in the same direction as that of the belt-shaped film for a fixed time, and after the sealing is completed, both the seal bars must be brought out from an orbit of the belt-shaped film and returned to their original positions. In short, both the seal bars are allowed to carry out block motion.

Conventionally, JP7-291234 A discloses that a seal bar supporting frame is allowed to reciprocate along a transfer orbit of a tube film by revolution of a crankshaft, a pair of seal bars provided on the seal bar supporting frame are moved toward and away from each other, thereby allowing both the seal bars to carry out the block motion. However, only one half of the revolution orbit of the crankshaft can be used as an advancing region of the seal bar supporting frame. Further, a region where speed is extremely lowered exists in top and bottom dead centers of the revolution orbit sandwiching a stopped point. Therefore, there is a problem that the movement of the seal bars can be made constant only through about 120°.

SUMMARY OF THE INVENTION

It is an object of the present invention to move the tube film at a constant speed through one half region of a revolution orbit of a crankshaft, the seal bars closing the tube film between front and rear packaged objects, and evacuating the film from a cut formed in the closed portion.

The present invention provides a bag forming-filling-packaging machine comprising: a seal bar supporting frame which reciprocates along a transfer orbit of a tube film for packaging therein an object; a pair of seal bars disposed on the frame; and a crank mechanism which transmits a swinging motion of the arm having a support shaft on its one end as its fulcrum to the seal bar supporting frame through a connecting rod, thereby allowing the frame to reciprocate along the transfer orbit of the tube film, wherein both the seal bars are allowed to carry out block motion by a combination motion of the reciprocating motion of the frame, and approaching and separating motions of the pair of seal bars disposed on the frame such as to sandwich the tube frame, and while the tube film is being griped with pressure by the seal bars, air in the film is sucked and removed through a cut formed in a pressure-gripped region of the film, and then the cut is heated and sealed, characterized in that the bag forming-filling-packaging machine further comprises: a mechanism for slidably engage a slider supported by a crankshaft with a guide formed along the arm, and swings the arm by the crankshaft which is revolved by a servo motor; and a controller which defines opposite side regions of the arm swinging region as deceleration regions, and sends a calculation signal to the servo motor such that a swinging speed of the arm becomes constant in a region, in which a rotation angle of the crankshaft is 180°, inside the deceleration regions.

According to the present invention, due to the above structure, an open end of the arm which swings by a circular revolution motion of the crankshaft swings in an arc shape around the one end support shaft. Therefore, as the support shaft approaches the center of the revolution of the crankshaft, the arm moves the seal bar supporting frame forward in a one half region of the revolution circle of the crankshaft, i.e., in a region of a revolution angle of 180° or greater, and moves the seal bar supporting frame backward at high speed in a region of remaining 180° or less. In short, as a distance from the center point of the revolution circle to the one end support shaft center of the arm is shortened, the retreating region of the seal bar supporting frame is shortened, and it is possible to increase the forward region of the support frame correspondingly. If calculation data for keeping constant the swinging angle speed of the arm in the revolution angle region of 180° is stored in the memory, whenever the crankshaft reaches the revolution angle region of 180°, the controller controls the rotation speed of the servo motor such that the swinging angle speed of the arm becomes constant. As a result, it is possible to carry out the relatively long time sealing operation which carries out the vacuum suction procedure in the tube film by both the seal bars and the heat sealing procedure through the cut in a stepwise manner without lowering the efficiency.

BRIEF DESCRIPTION OF THE DRAWINGS

FIG. 8 is an explanatory table in which numeric values shown in FIG. 7 are transcribed;

DESCRIPTION OF THE PREFERRED EMBODIMENT

Figure 2:
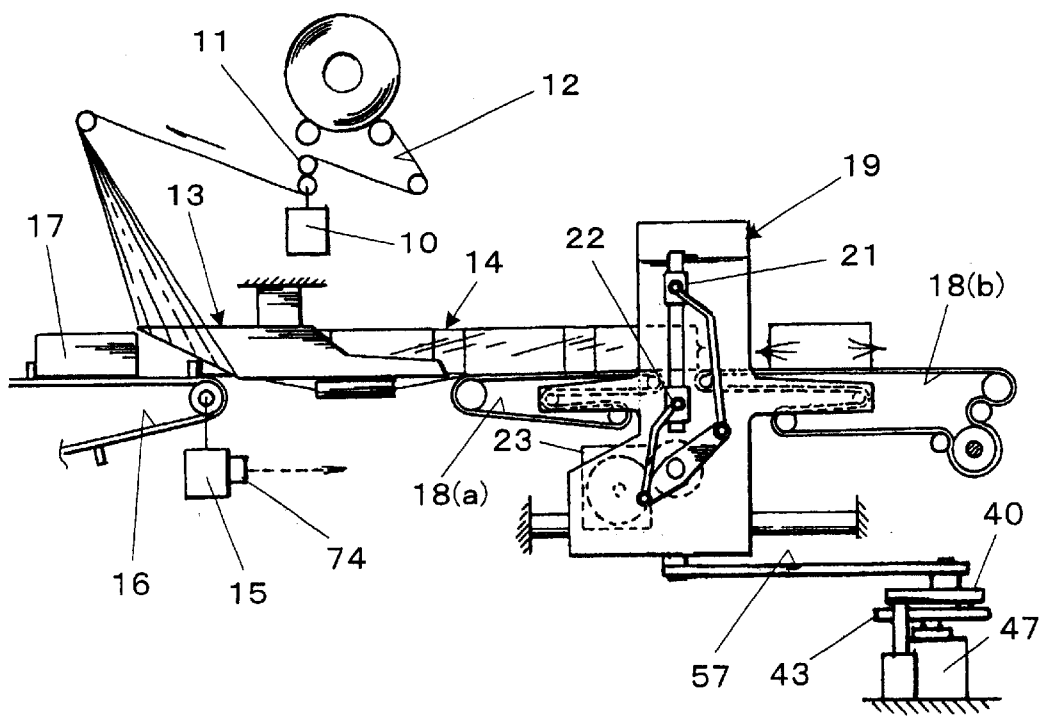
FIG. 2 is a side view of a bag forming-filling-packaging machine.

FIG. 2 shows an entire bag forming-filling-packaging machine. A belt-shaped film 12 is pulled out by a roll 11 which rotates together with a motor 10. The belt-shaped film 12 is allow to pass through a cylindrical former 13, and is wound into a tubular shape 14. A chain conveyor 16 which is rotated by a transfer-in motor 15 transfers an object to be packaged (hereinafter, simply called object 17) into the tubular shape 14 at equal distances from one another. Opposed ends of a first transfer conveyor 18a and a second transfer conveyor 18b are fixed to a seal bar supporting frame 19. The frame 19 is provided with a pair of upper and lower seal bars 21 and 22.

Figure 3:
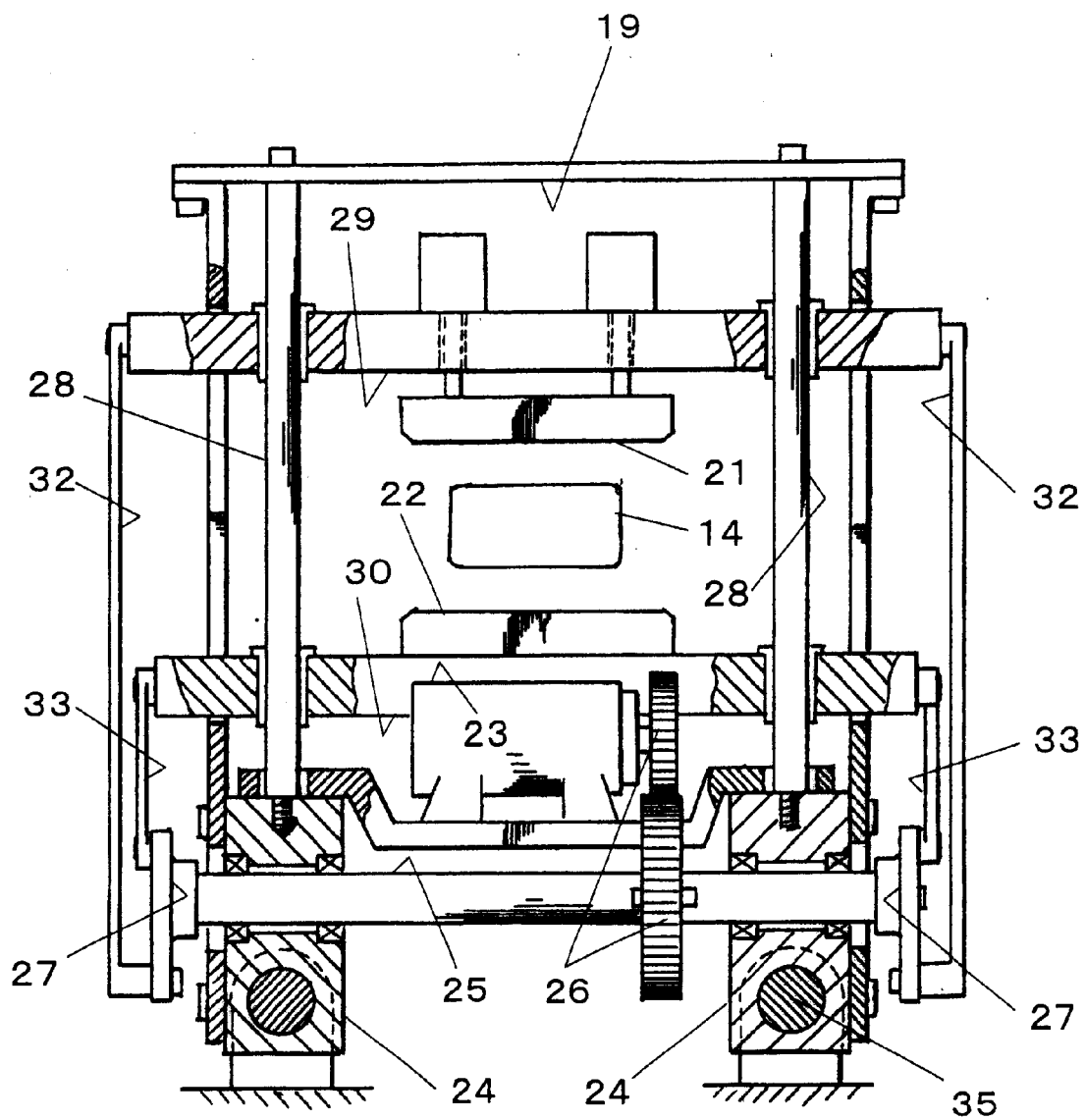
FIG. 3 is a front view of the seal bar supporting frame.

FIG. 3 is a front view of the seal bar supporting frame 19. A motor 23 mounted to the portal supporting frame 19 and an operating shaft 25 provided between a pair of slide blocks 24 and 24 on opposite lower portions of the supporting frame 19 are connected to each other by means of a pair of gears 26 and 26. Bell cranks 27 are fixed to opposite ends of the operating shaft 25. A pair of upper and lower bridge members 29 and 30 are vertically movably provided between guide rods 28 standing upright from both the slide blocks 24 and 24. Seal bars 21 and 22 are respectively fixed to the upper and lower bridge members 29 and 30. By swinging the operating shaft 25 in normal and reverse directions by power of the motor 23, the upper and lower seal bars which are connected to each other through the bell cranks 27 and 27 on the opposite ends and links 32 and 33 are moved toward and away from each other, and the tube film 14 is heated and sealed at constant distances.

Figure 1:
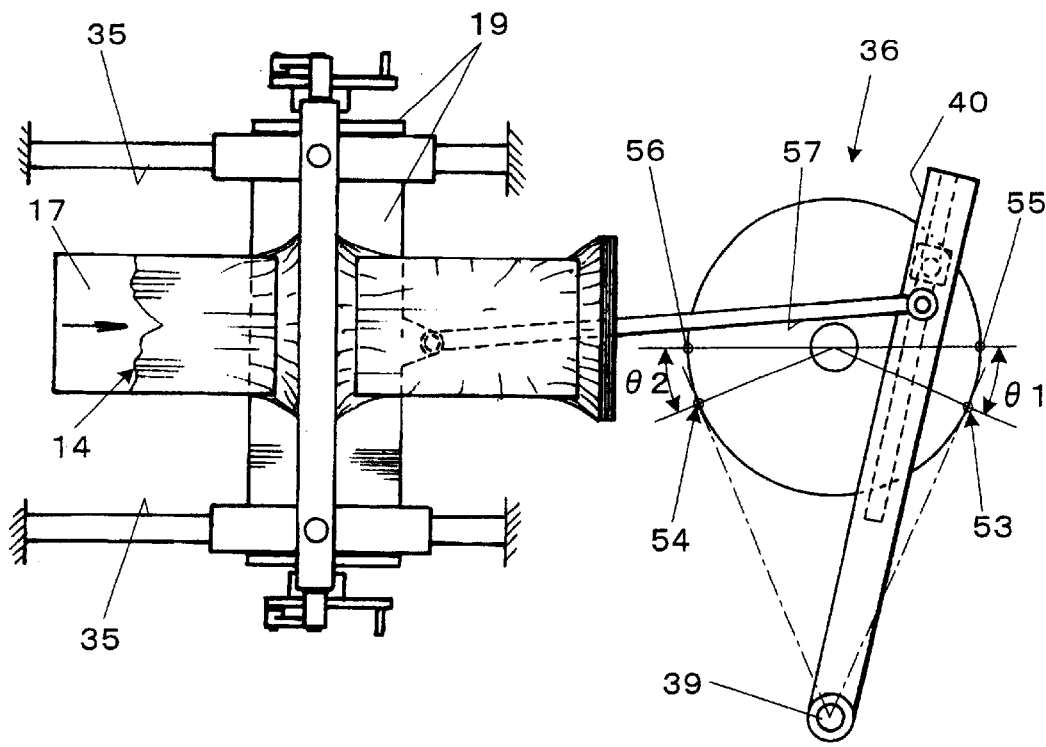
FIG. 1 is a plan view of a crank mechanism and a seal bar supporting frame.
Figure 4:
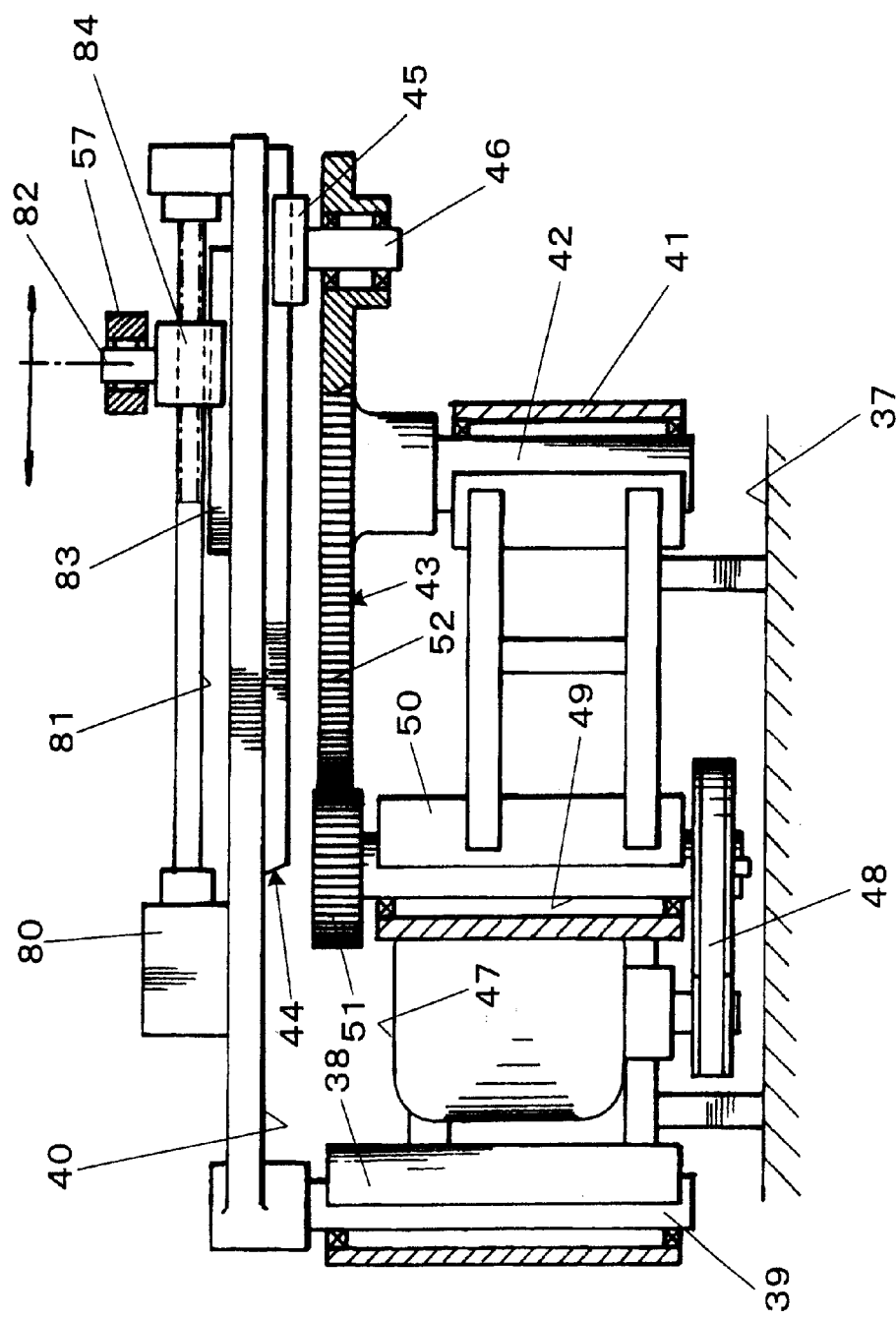
FIG. 4 is a side view of the crank mechanism.

FIG. 1 is a plan view of the frame 19 supported by a pair of rails 35 and 35, and a crank mechanism 36 which moves the frame 19 back and forth along the rails 35 and 35. As shown in FIG. 4 in detail, the crank mechanism 36 has a bearing 38 fixed to a stage 37. The bearing 38 includes a arm 40 which supports a support shaft 39 formed on one of ends of the bearing 38 and which can be swung, and a circular crank plate 43 whose center shaft 42 is supported by a second bearing 41 which is fixed to the stage 37. A slide guide 44 is formed along a longitudinal direction of a lower surface of the arm 40. A groove-like slider 45 engaged with the slide guide 44 is fixed to a crankshaft 46 which is rotatably supported by an eccentric portion of the crank plate 43. A shaft 49 is supported by a third bearing 50. This shaft 49 and a servo motor 47 are connected to each other through a belt 48. A pinion 51 is fixed to an upper end of the shaft 49. The pinion 51 is engaged with parallel tooth 52 formed on a peripheral edge of the crank plate 43.

Figure 5:
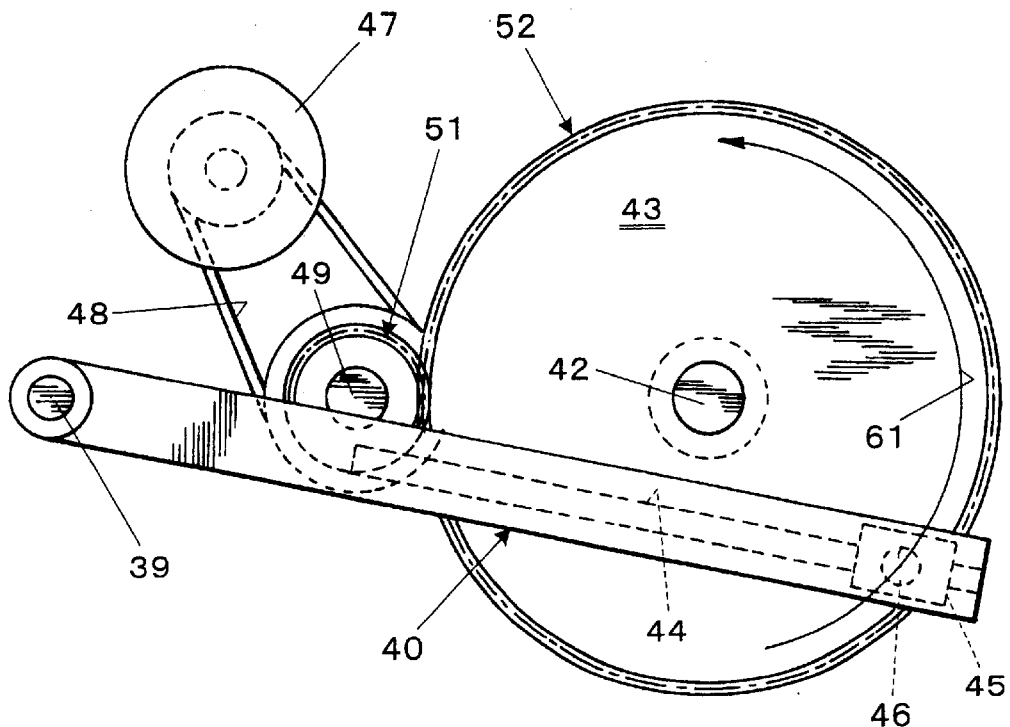
FIG. 5 is a plan view of FIG. 4.
Figure 6:
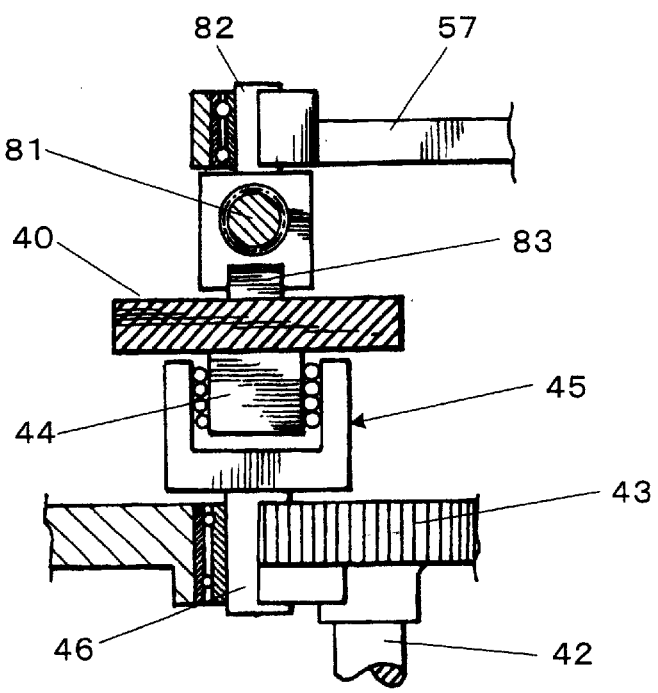
FIG. 6 is a sectional view of a connection portion between a crankshaft and an arm.

In FIG. 5, if the crank plate 43 is rotated by rotation power of the pinion 51 connected to the servo motor 47, the crankshaft 46 is revolved along an orbit shown with an arrow around the center shaft 42. The groove-like slider 45 (see FIG. 6) fixed to the crankshaft 46 is moved along the slide guide 44 of the arm 40 and as a result, the arm 40 is swung around the one end support shaft 39. In this case, in FIG. 1, the top dead center 53 and the bottom dead center 54 of the arm 40 which swings around the support shaft 39 are in a 180° region connected with the center shaft 42, i.e., the top dead center 53 and the bottom dead center 54 of the arm 40 are in positions exceeding regions of points 55 and 56 through θ1 and θ2. A connecting rod 57 moves the frame 19 forward and backward at high speed along the rails 35 and 35 in the regions of both the dead centers 53 and 54.

Figure 7:
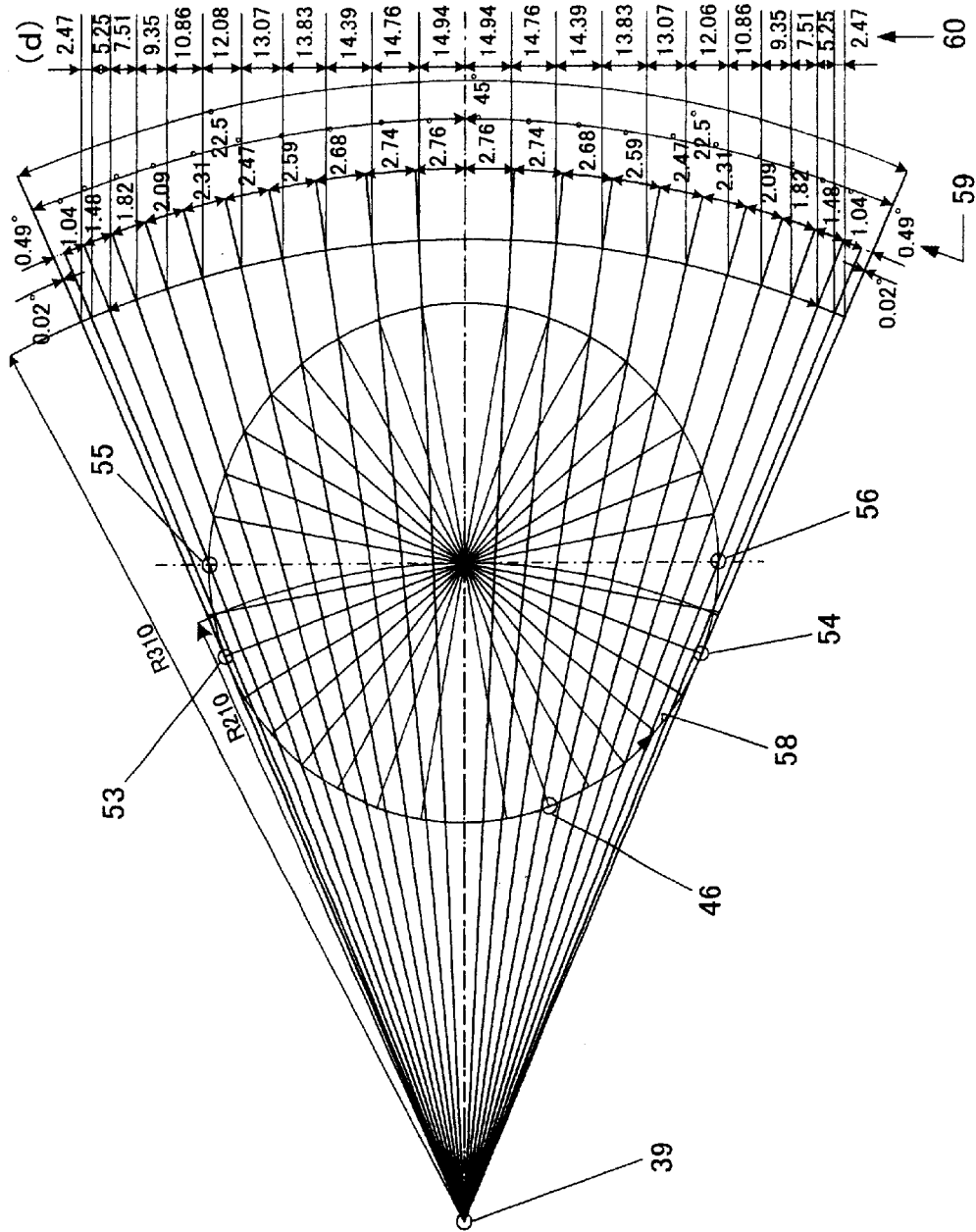
FIG. 7 is an explanatory view of swing angle numeric values of the arm.

FIG. 7 is an analytic diagram in which a swing angle of the arm 40 having a length of 310 mm around the support shaft 39 is divided every 10° when the crankshaft 46 is revolved on a circular orbit 58 having a radius of 80.36 mm, and FIG. 7 shows a swinging angle numeric value 59 of the arm per 10° and a millimeter numeric value 60 of straight movements of the seal bars 21 and 22 per the angle value. If the arm swinging angle numeric value 59 which is divided into 18 between the point 55 and the point 56 which corresponds to 180° in FIG. 7 is transcribed, the arm swinging angle numeric value 59 corresponds to regions of swinging angles 1 to 9 in FIG. 8. If these angle numeric values are expressed by lengths, they correspond to sizes shown in a right column. If the servo motor 47 rotates with constant velocity, the seal bars 21 and 22 do not reciprocate with constant velocity as shown in the corresponding sizes. Thereupon, if an average value of the 9 corresponding sizes shown in the right column is calculated, the average value becomes 12.31 mm. Therefore, the speed of the servo motor 47 is controlled such that the arm moves through the swinging angles 1 to 9 every 12.31 mm per unit time.

Figure 9:
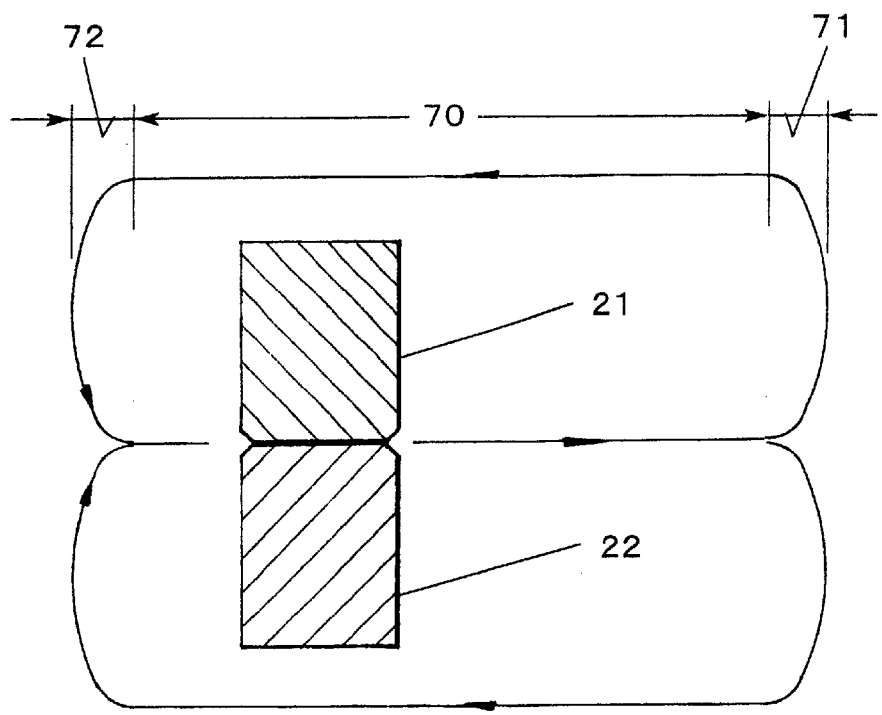
FIG. 9 is an explanatory view of an block motion orbit of the seal bar.

A total value 7.76 mm shown in a lower portion in FIG. 8 is a value of θ1 and θ2 in FIG. 1. In FIG. 9, by controlling the speed of the servo motor 47 as described above, the pair of seal bars 21 and 22 move through a region of a straight orbit 70 with constant velocity, and return at front and rear regions 71 and 72 and carry out the block motion. The regions 71 and 72 correspond to θ1 and θ2 in FIG. 1. In the regions 71 and 72, the speed of the servo motor 47 is not controlled unlike the region of the straight orbit 70.

Figure 10:
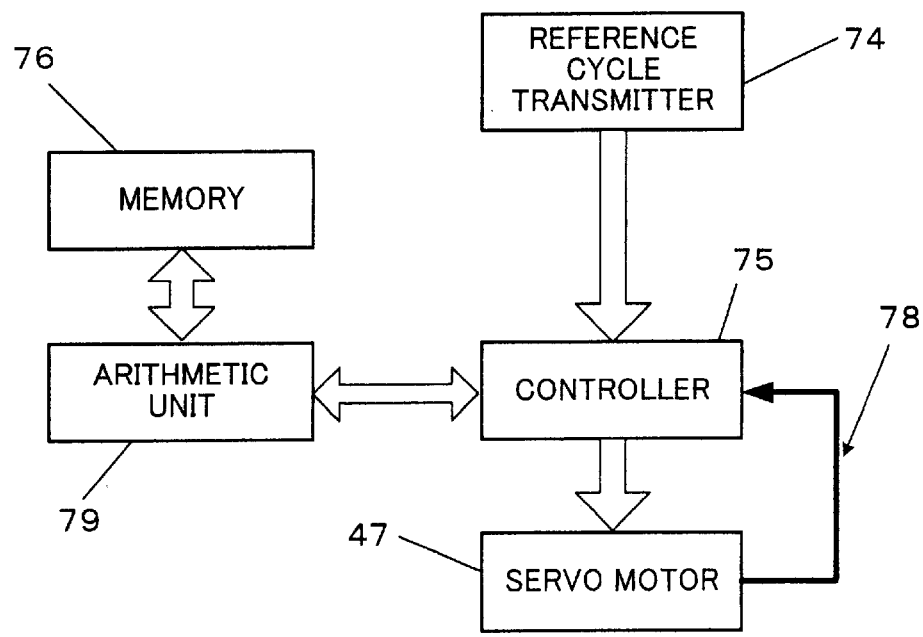
FIG. 10 is an explanatory block diagram of a control apparatus.

A reference cycle transmitter 74 in FIG. 10 is the same as a pulse transmitter 74 mounted to the transfer-in motor 15 shown in FIG. 2. The reference cycle transmitter 74 transmits, to a controller, a signal indicative of the same distance as a transfer-in pitch of the object 17 with respect to the tube film 14, and controls the servo motor 47 at the same cycle. Data shown in FIG. 8 and a calculation equation of its average value are input to a memory 76 shown in FIG. 10. In FIG. 10, an arithmetic unit 79 calculates a positional angle from a rotation feedback signal 78 from the servo motor 47, and an output speed of the servo motor 47 is controlled based on corresponding data stored in the memory 76. By such control, the seal bars 21 and 22 move through the straight orbit 70 with constant velocity.

When a length of the object 17 to be transferred into the tube film is changed to be shortened, the speed of the film motor 10 is reduced, and a distance between each packaged objects 17 is held constantly. In this case, in FIG. 4, a screw rod 81 is rotated by a micro motor 80, a pin 82 which supports an end of the connecting rod 57 is displaced along the guide 83, and the reciprocating amount of the seal bar supporting frame 19 shown in FIG. 2 is adjusted. The screw rod 81 is formed at its outer periphery with a male thread, and is disposed on the arm 40. One end of the screw rod 81 is connected to the micro motor 80, and the other end thereof is supported by a bearing, and the screw rod 81 can rotate in clockwise and counterclockwise directions. A slide 84 fixing the screw rod 81 and the male thread pin 82 is fitted, and the slide 84 is fitted into a slide guide 83 formed on the arm.

Figure 11:
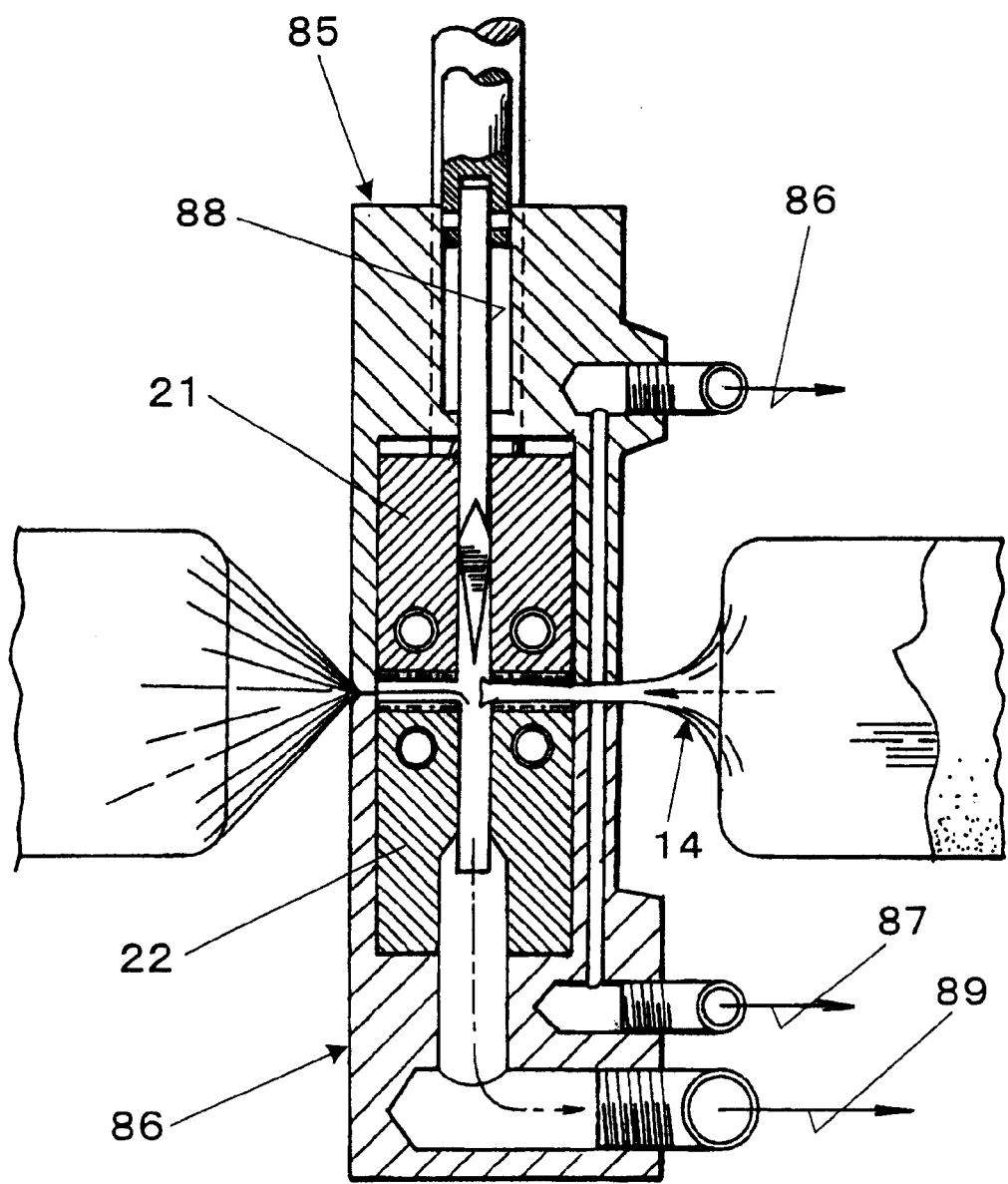
FIG. 11 is a sectional view of a seal bar.

FIG. 11 shows a sealing mechanism disposed on the seal bar supporting frame. In this mechanism, the tube film 14 is sandwiched between upper and lower blocks 85 and 86, a vacuum pressure is applied to first vacuum lines 86 and 87 to suck the tube films 14 such as to form a gap between the tube films 14 behind the object 17. Air in the tube films 14 which are opened by cutting effect of a cutting blade 88 is discharged out from a second vacuum line 87 as shown with a dotted line. Thereafter, a bag opening is heated and sealed by relative approach of both the upper and lower seal bars 21 and 22. In this manner, this mechanism carries out a heat sealing procedure with respect to the tube film and a vacuum suction procedure in two stages. Since the running time on the straight orbit is relatively long, it is possible to maximize the utilization of the constant speed movement of the supporting frame 19 by the arm 40 shown in FIG. 1.

What is claimed is:

1. A bag forming-filling-packaging machine comprising:
a seal bar supporting frame which reciprocates along a transfer orbit of a tube film for packaging therein an object; a pair of seal bars disposed on said frame; and a crank mechanism for transmitting a swinging motion of an arm having a support shaft on its one end as its fulcrum to said seal bar supporting frame through a connecting rod, thereby allowing said frame to reciprocate along said transfer orbit of said tube film, wherein both said seal bars are allowed to carry out block motion by a combined motion of the reciprocating motion of said frame, and an approaching motion and a separating motion of said pair of seal bars disposed on said frame such as to sandwich said tube frame, and while said tube film is being gripped with pressure by said seal bars, air in said film is sucked and removed through a cut formed in a pressure-gripped region of the film, and then said cut is heat sealed, said bag forming-filling-packaging machine further comprising:

a mechanism for slidably engage a slider supported by a crankshaft with a guide formed along said arm, and swings said arm by said crankshaft which is revolved by a servo motor; and a controller defining opposite sides of the arm swinging region as deceleration regions, and sending a calculation signal to said servo motor to cause a swinging speed of said arm to be constant in a region having a rotation angle of 180° of said crankshaft inside said deceleration regions.

2. The bag forming-filling-packaging machine according to claim 1, wherein said controller brings a rotation cycle of said servo motor into agreement with a cycle signal from a reference cycle transmitter, calculates a positional angle from a rotation feedback signal from said servo motor using an arithmetic unit, and controls an output speed of said servo motor based on corresponding data stored in a memory.

3. The bag forming-filling-packaging machine according to claim 1, wherein a pin is engaged with a screw rod disposed along said arm, while an end of said connecting rod connected to said seal bar supporting frame is engaged with said pin, and said pin is caused to displace along said screw rod by rotation of said screw rod caused by a micro motor.

* * * * *